United States Patent Office 3,046,261
Patented July 24, 1962

3,046,261
FLUORINATED ORGANIC COMPOUNDS
Hyman Iserson, Erdenheim, Pa., assignor to Pennsalt Chemicals Corporation, Philadelphia, Pa., a corporation of Pennsylvania
No Drawing. Filed Apr. 6, 1959, Ser. No. 804,084
17 Claims. (Cl. 260—87.5)

This invention relates to the perfluorinated conjugated diene perfluorovinylcyclobutene and homopolymers and copolymers thereof.

The perfluorinated conjugated diene, perfluorobutadiene $CF_2=CF-CF=CF_2$ is well known and many attempts have been made to polymerize this compound to produce useful polymers. It has been found to polymerize, however, only with great difficulty. For example, the polymerization of hexafluorobutadiene to high molecular weight polymers required extremely high pressures of the order of 225,000 lbs./in.$^2$ gage as reported by Slesser and Schram, "Preparation, Properties, and Technology of Fluorine and Organic Fluoro Compounds," McGraw-Hill, 1951, pages 625–626.

In accordance with the present invention a new conjugated perfluorinated diene has been discovered, namely perfluorovinylcyclobutene having the formula:

$$CF_2=CF-C=CF$$
$$\phantom{CF_2=CF-}|\phantom{=}|$$
$$\phantom{CF_2=CF-}CF_2-CF_2$$

which polymerizes with ease to form valuable polymeric materials.

In accordance with the invention this new diene is prepared by the dehalogenation of the compound 1-iodo-2-(1,2-dichloro-1,2,2-trifluoroethyl) perfluorocyclobutane:

$$CF_2ClCFCl-CF-CFI$$
$$\phantom{CF_2ClCFCl-}|\phantom{-}|$$
$$\phantom{CF_2ClCFCl-}CF_2-CF_2$$

Loss of the two chlorines, the iodine atom, and the adjacent fluorine, produces the desired conjugated diene. The dehalogenation of the iodide to produce the desired diene is preferably carried out with the use of an excess of metallic zinc in a suitable medium, preferably acetic acid, or other mediums such as acetamide, ethanol, or dioxane. The reaction is preferably carried out at room temperature to the reflux temperature of the reaction mixture.

The intermediate iodide, 1-iodo-2(1,2-dichloro-1,2,2-trifluoroethyl) perfluorocyclobutane, may in turn be prepared by heating 1,2-dichloro-1,1,2-trifluoroiodoethane, $CF_2ClCFClI$, with perfluorocyclobutene $$CF=CF$$
$$|\phantom{=}|$$
$$CF_2-CF_2$$

under pressures from 1000 to 10,000 lbs./in.$^2$ gage and preferably from 3000 to 7000 lbs./in.$^2$ gage and at temperatures of from 15° to 350° C. and preferably from 200 to 300° C. for reaction periods of a few hours to as much as two weeks and using molar ratios of iodide to olefin ranging from about 1:2 to 20:1. As well as producing the desired iodide in which one mole of $$CF_2ClCFClI$$

reacts with one mole of perfluorocyclobutene, there is also obtained from this reaction higher products resulting from a telomerization reaction having the formula:

$$CF_2ClCFCl{-}{\left[{-}CF{-}CF{-}\atop{|\phantom{-}|}\atop{CF_2-CF_2}\right]}_n{-}I$$

containing repeating perfluorocyclobutyl $$\left[{-}CF{-}CF{-}\atop{|\phantom{-}|}\atop{CF_2-CF_2}\right]$$

radicals. The letter $n$ indicates the number of repeating units in the telomer chain. The higher telomers tend to be produced with low iodide to olefin ratios, with longer reaction periods, and at higher temperatures. The value of $n$ may range from 2 to as high as 10 for example. While the desired iodide resulting from the reaction of one mole of $CF_2ClCFClI$ with one mole of perfluorocyclobutene may be separated from the higher telomers by fractional distillation, it is, of course, preferred to operate the reaction under conditions which provide a maximum yield of the 1:1 adduct and a minimum yield of the higher telomers. In general, a maximum yield of the desired 1:1 adduct is obtained by using an excess of the iodide $CF_2ClCFClI$.

The following example illustrates the above method for preparing perfluorovinylcyclobutene:

*Example 1*

(a) PREPARATION OF $CF_2ClCFCl-CF-CFI$
$$\phantom{(a) PREPARATION OF CF_2ClCFCl-}|\phantom{-}|$$
$$\phantom{(a) PREPARATION OF CF_2ClCFCl-}CF_2-CF_2$$

A 300 milliliter Monel metal autoclave is charged with 265 grams of $CF_2ClCFClI$ and then is charged by vacuum gaseous transfer with 202 grams of perfluorocyclobutene. The autoclave is sealed and heated while shaking for 158 hours at 225° C. The initial pressure of 5250 lbs./in.$^2$ gage (at 225° C.) drops during the reaction period to 3825 lbs./in.$^2$ gage. The autoclave is cooled to room temperature and vented. The reaction products are filtered to remove a small amount of iodine and the filtrate is distilled under vacuum and the following fractions obtained:

(a) Unreacted $CF_2ClCFClI$ is removed at a pressure of 80 mm. Hg at a temperature of 37° to 45° C.

(b) 50 grams of $$CF_2ClCFCl-CF-CFI$$
$$\phantom{CF_2ClCFCl-}|\phantom{-}|$$
$$\phantom{CF_2ClCFCl-}CF_2-CF_2$$

having a boiling range 61° to 66° C. at 23 mm. Hg and a refractive index $n_D^{27.5}$ 1.4073. Analysis of this fraction is as follows: Calculated for $C_6Cl_2F_9I$, C, 16.3; H, 0.0; I, 28.8. Found, C, 16.6; H, 0.0; I, 28.4.

(c) 14.4 grams of telomer of the formula:

$$CF_2ClCFCl{-}{\left[{-}CF{-}CF{-}\atop{|\phantom{-}|}\atop{CF_2-CF_2}\right]}_2{-}I$$

having a boiling range of 73 to 79° C. at 5 to 6 mm. Hg and a refractive index $n_D^{24.5}$ 1.3963. Analysis of this fraction is as follows: Calculated for $C_{10}Cl_2F_{15}I$, C, 19.9; H, 0.0. Found, C, 19.4; H, 0.0.

(d) 6 grams of a viscous oil consisting of higher telomers of the formula:

$$CF_2ClCFCl{-}{\left[{-}CF{-}CF{-}\atop{|\phantom{-}|}\atop{CF_2-CF_2}\right]}_n{-}I$$

where the value of $n$ is greater than 2.

(b) DEHALOGENATION OF $CF_2ClCFCl-CF-CFI$
$$\phantom{(b) DEHALOGENATION OF CF_2ClCFCl-}|\phantom{-}|$$
$$\phantom{(b) DEHALOGENATION OF CF_2ClCFCl-}CF_2-CF_2$$

Sixty grams of activated zinc, 125 milliliters of glacial acetic acid and 0.5 gram of fused zinc chloride are placed in a flask fitted with an addition funnel, stirrer and water-cooled reflux condenser. The condenser is connected at its outlet to a trap cooled in a mixture of Dry Ice and acetone. The reaction mixture in the flask is heated to reflux temperature and stirred rapidly while 22 grams of $$CF_2ClCFCl-CF-CFI$$
$$\phantom{CF_2ClCFCl-}|\phantom{-}|$$
$$\phantom{CF_2ClCFCl-}CF_2-CF_2$$

is added to the flask drop by drop. Refluxing is continued for 4 additional hours after which the flask is cooled and the liquid decanted and diluted with water.

An oil layer separates which is then combined with the liquid condensed in the Dry Ice-acetone trap. The combined fraction is neutralized with 10% aqueous sodium carbonate solution and washed with water. On distillation there is obtained 4.5 grams of product which on refractionation has a boiling point of 59° to 61° C. consisting of the conjugated diene:

$$CF_2{=}CF-\underset{\underset{CF_2-CF_2}{|\qquad|}}{C}{=\!=\!=}CF$$

The infrared spectrum of this diene shows absorption peaks at 5.69 and 5.86μ indicating the presence of conjugated double bonds. There is no C–H absorption band. Elemental analysis and molecular weight determinations were made on this diene with the following results. Calculated for $C_6F_8$, C, 32.15; H, 0.0%; molecular weight, 224. Found, C, 32.15; H, 0.0; molecular weight, 223.2.

A second method for the preparation of perfluorovinylcyclobutene $$CF_2{=}CF-\underset{\underset{CF_2-CF_2}{|\qquad|}}{C}{=\!=\!=}CF$$

is by the dehalogenation of the compound 1-iodo-2-trifluorovinyl-perfluorocyclobutane $$CF_2{=}CF-\underset{\underset{CF_2-CF_2}{|\qquad|}}{CF}-CFI$$

The dehalogenation of this compound may be carried out in the same manner as the dehalogenation of 1-iodo-2(1,2-dichlorotrifluoroethyl) perfluorocyclobutane, that is by the use of metallic zinc in a suitable medium such as acetic acid. Loss of the iodine atom and the fluorine adjacent to the vinyl group gives the desired conjugated diene.

The above iodide may in turn be prepared by the addition of $CF_2{=}CFI$ to perfluorocyclobutene in accordance with the following reaction:

$$CF_2{=}CFI + CF{=}CF\underset{\underset{CF_2-CF_2}{|\qquad|}}{\phantom{xx}} \longrightarrow CF_2{=}CF-\underset{\underset{CF_2-CF_2}{|\qquad|}}{CF}-CFI$$

The above reaction is carried out by heating the reactants under pressures of from 1000 to 10,000 lbs./in.$^2$ gage and preferably from 3000 to 7000 lbs./in.$^2$ gage and the temperatures of from 150° C. to 350° C. and preferably from 200° C. to 300° C. for reaction periods of a few hours to e.g. two weeks, using molar ratios of $CF_2{=}CFI$:perfluorocyclobutene of from about 1:2 to 20:1. As in the case of the addition of $CF_2ClCFClI$ to perfluorocyclobutene higher molar ratios of $CF_2{=}CFI$ to perfluorocyclobutene tend to favor the formation of the desired 1:1 adduct and a minimum amount of higher telomers of the formula:

$$CF_2{=}CF{-}{\left[\underset{\underset{CF_2-CF_2}{|\qquad|}}{CF-CF}\right]}_n{-}I$$

where the value of $n$ may range, for example, from about 2 to 10. The desired 1:1 adduct may be separated from these telomers by fractional distillation.

The following example illustrates the preparation of the diene:

$$CF_2{=}CF-\underset{\underset{CF_2-CF_2}{|\qquad|}}{C}{=\!=\!=}CF$$

by the foregoing method.

*Example 2*

A 300 milliliter Monel autoclave fitted with a glass liner is loaded with 104 grams (0.5 mole) of $CF_2{=}CFI$ after which 48.6 grams (0.3 mole) of perfluorocyclobutene is introduced by vacuum gaseous transfer. The autoclave is sealed and heated with shaking for 130 hours at 230 C. at autogenous pressure. After cooling the autoclave to room temperature and venting, the liquid contents are filtered and fractionated. The compound $$CF_2{=}CF-\underset{\underset{CF_2-CF_2}{|\qquad|}}{CF}-CFI$$

is obtained together with higher telomers of the formula $$CF_2{=}CF{-}{\left[\underset{\underset{CF_2-CF_2}{|\qquad|}}{CF-CF}\right]}_n{-}I$$

where the value of $n$ is 2 and higher.

The compound $$CF_2{=}CF-\underset{\underset{CF_2-CF_2}{|\qquad|}}{CF}-CFI$$

is dehalogenated by treatment with an excess of metallic zinc in glacial acetic acid in the manner described in Example 1 for the dehalogenation of $$CF_2ClCFCl-\underset{\underset{CF_2-CF_2}{|\qquad|}}{CF}-CFI$$

to produce the conjugated diene $$CF_2{=}CF-\underset{\underset{CF_2-CF_2}{|\qquad|}}{C}{=\!=\!=}CF$$

The perfluorinated conjugated diene $$CF_2{=}CF-\underset{\underset{CF_2-CF_2}{|\qquad|}}{C}{=\!=\!=}CF$$

readily homopolymerizes, and also copolymerizes with copolymerizable ethylenically unsaturated compounds to produce polymeric materials having in some instances elastomeric properties and having high chemical and thermal stability. The ease with which this diene polymerizes is evidenced by the fact that it may be polymerized at atmospheric pressures by ultraviolet light irradiation or by polymerization in the presence of catalysts such as organic peroxides at relatively low pressures.

In carrying out polymerizations by ultraviolet light irradiation, the polymerization is most conveniently carried out at relatively low temperatures, e.g. 0° to 100° C. using reaction periods ranging from e.g. from one-half to 300 hours and pressures which may range from atmospheric to any desired pressure.

Suitable free-radical producing polymerization catalysts which may be employed in carrying out the homopolymerization or copolymerization of the diene of the invention include organic catalysts such as benzoyl peroxide, acetyl peroxide, trichloroacetyl peroxide, azodiisobutyronitrile, di-tertiary butyl peroxide, or dipropionyl peroxide; alkyl peroxides such as diethyl peroxide or tertiary butyl hydroperoxide. Suitable in organic peroxides include e.g. barium peroxide, zinc peroxide, or the like which may be used alone or in conjunction with an anhydride of an organic acid; peroxy acids or their salts, e.g. persulfuric acid, ammonium persulfate, potassium persulfate, potassium percarbonate, potassium perphosphate, or sodium perborate. Other suitable polymerization catalysts include e.g. hydrazine salts, such as hydrazine sulfate, and amine oxides such as trimethyl amine oxide.

If desired, buffers may be employed such as sodium pyrophosphate, sodium acid phosphate, sodium bicarbonate, sodium carbonate, or sodium acetate in conjunction with the catalyst particularly where aqueous polymerization media are used.

Promoters may also be employed, if desired, along with the catalyst, such as a reducing agent in conjunction with a peroxy catalyst in a so-called redox polymerization system. Suitable reducing agents include, for example, reduced iron salts such as ferrous ammonium sulfate, sodium sulfite, sodium bisulfite, sodium hydrosulfite, and sodium thiosulfate and the like. If desired, the molecular weight of the polymer may be controlled by addition of regulators such as long chain mercaptans, e.g. tertiary dodecyl mercaptan.

While the amount of catalysts employed is not critical, it should generally be employed in an amount of at least 0.005% based on the weight of the monomer and generally not more than about 5% on the same basis. Usually, the preferred concentration of the catalyst will range from about 0.01% to 3% by weight based on the total weight of monomer.

The polmerization may be carried out at low pressures, preferably ranging from atmospheric to 1000 lbs./in.$^2$ and more usually from 50 pounds to 500 lbs./in.$^2$, although higher pressures may be employed if desired. Moderate reaction temperatures ranging from −30° C. to 150° C. and more usually from 0° C. to 100° C. are generally suitable when free radical forming polymerization catalysts are used. Reaction time is not critical, longer reaction periods generally favoring higher conversions. Usually, the practicable reaction periods will range from 5 minutes to a day.

A preferred polymerization procedure involves polymerization in the presence of water using a free radical forming catalyst such as potassium persulfate and deoxygenated water, and desirably an emulsifying agent such as sodium lauryl sulfate or a perfluoro or perfluorochloro acid having six or more carbon atoms. This mixture is charged to a reactor after which the monomer is introduced, e.g. by vacuum gaseous transfer, taking care to exclude oxygen, the reactor then being closed and heated with agitation for a reaction period e.g. one-half to 24 hours at a temperature e.g. 0° C. to 100° C. providing a good conversion of the monomer to polymer.

The following examples illustrate the preparation of the homopolymer.

*Example 3*

In to an 8 mm. Vycor (96% silica glass) tube there is introduced 0.5 gram of perfluorovinylcyclobutene after which the tube is sealed in vacuum and placed about 3 centimeters from an ultraviolet light source. The tube is irradiated for 3 weeks at room temperature. The solid polymer is removed from the tube and heated in a vacuum oven (operating at about 29 inches H$_2$O) at a temperature of 55 to 70° C. for 4 hours. Analysis of the polymer shows that it contains 31.8% carbon as compared to a theoretical carbon content for (C$_6$F$_8$)$_n$ of 32.15%.

*Example 4*

Thirty grams perfluorovinylcyclobutene, 0.4 gram C$_7$F$_{15}$COONH$_4$ and a solution consisting of 1 gram K$_2$S$_2$O$_8$, 1.5 gram Na$_4$P$_2$O$_7$·10H$_2$O, 0.5 gram Na$_2$SO$_3$ in 80 ml. distilled and deoxygenated water are placed in a 7 ounce bottle which is then purged with nitrogen and capped. The bottle is rotated end over end in a water bath at 60° C. for 20 hours. The contents are removed, cooled at −15° C. for 15 hours and then warmed to room temperature. The precipitated polymer polyperfluorovinylcyclobutene is washed thoroughly with water and dried in vacuum at 75° C.

The diene of the invention readily forms copolymers of valuable properties with copolymerizable ethylenically unsaturated compounds. Preferred comonomers are ethylenically unsaturated compounds having from 2 to 10 carbon atoms, particularly halogenated and more especially fluorinated compounds of this type. A particularly valuable group of comonomers are the haloethylenes such as CH$_2$=CF$_2$, CF$_2$=CF$_2$, CF$_2$=CFCl, CF$_2$=CCl$_2$, CF$_2$=CHCl, CF$_2$=CFH, CH$_2$=CHCl, and CH$_2$=CHF. Particularly preferred among the haloethylenes as comonomers are vinylidene fluoride, tetrafluoroethylene and chlorotrifluoroethylene.

Other preferred comonomers include particularly compounds having terminal double bonds such as perfluoropropene, perfluorobutene-1, perfluoroisobutylene and the like; vinyl ethers, such as ethylvinyl ether, trifluoroethylvinyl ether, acrylates, methacrylates, styrene, acrylonitrile and the like.

Other comonomers that may be polymerized with the diene of the invention include epoxides such as ethylene oxide, particularly the 1,2-epoxides; haloethylenes such as CFCl=CFCl, CHF=CFCl; internally double bonded olefins such as perfluorobutene-2; and butadienes such as 2-methylbutadiene and halogenated butadienes such as 2-chlorobutadiene and fluoro- or fluorochlorobutadienes.

The copolymerization of the diene of the invention with such comonomers may be carried out using a wide variety of ratios of perfluorovinylcyclobutene to the other monomer. Generally, however, the weight ratio of perfluorovinylcyclobutene to the other monomer will range from about 95:5 to 5:95 and in most cases from 85:15 to 15:85. If desired, a mixture of two or more different comonomers may be copolymerized with perfluorovinylcyclobutene to form, for example a terpolymer.

*Example 5*

A Vycor tube is cooled in liquid nitrogen and is then charged with approximately 0.3 gram of perfluorovinylcyclobutene and 0.3 gram of vinylidene fluoride by vacuum gaseous transfer. The tube is sealed and irradiated by ultraviolet light for 19 days. It is then cooled, opened, vented and the tube and contents heated at 55° C. for 4 hours. The copolymer product is a solid of elastomeric properties.

*Example 6*

A Vycor tube is charged with approximately .2 gram of perfluorovinylcyclobutene and 1 gram of trifluoroethylvinyl ether, CF$_3$CH$_2$—O—CH=CH$_2$, after which the tube is sealed in vacuum. The tube and contents are then placed about 3 centimeters from an ultraviolet light source and irradiated for 24 hours. The tube is then cooled, opened and vented, and the resulting polymer product is heated in vacuum at 50° C. for 5 hours. Analysis of the polymer shows that it contains 36.7% carbon indicating the presence of 86.6 mole percent trifluoroethylvinyl ether and 13.4 mole percent of perfluorovinylcyclobutene in the polymer.

The homopolymers and copolymers prepared from perfluorovinylcyclobutene are useful in applications where properties such as chemical inertness and non-flammability are important. The low molecular weight polymers which may be liquids at normal temperatures are useful as dielectric fluids, lubricants and hydraulic fluids particularly in applications where exposure to chemically corrosive conditions is involved. The higher molecular weight polymers are useful for the production of films, fibers, gaskets, electrical insulation and the like.

I claim:
1. Conjugated perfluorovinylcyclobutene.
2. The compound

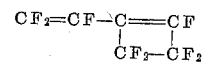

3. The method for preparing the diene

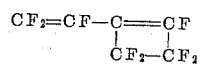

which comprises dehalogenating the compound

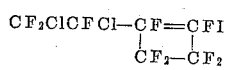

in the presence of a metallic halogen acceptor.

4. The method for preparing the diene

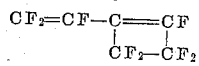

which comprises dehalogenating the compound

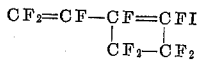

in the presence of a metallic halogen acceptor.

5. Polymeric perfluorovinylcyclobutene.
6. Polymers of the compound

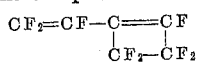

7. Homopolymers of conjugated perfluorovinylcyclobutene.
8. Homopolymers of the compound

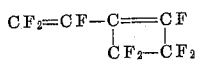

9. The method of polymerizing

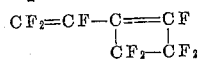

which comprises heating said diene while in contact with a peroxy polymerization catalyst.

10. The method of polymerizing the compound

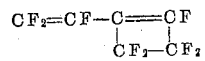

which comprises exposing said diene to ultraviolet light irradiation.

11. Copolymers of conjugated perfluorovinylcyclobutene and copolymerizable ethylenically unsaturated compounds, in which the weight ratio of perfluorovinylcyclobutene to the other monomer is in the range of from about 95:5 to 5:95.

12. Copolymers of conjugated perfluorovinylcyclobutene and haloethylenes, in which the weight ratio of perfluorovinylcyclobutene to the other monomer is in the range of from about 95:5 to 5:95.

13. Copolymers of conjugated perfluorovinylcyclobutene and fluorinated copolymerizable ethylenically unsaturated compounds, in which the weight ratio of perfluorovinylcyclobutene to the other monomer is in the range of from about 95:5 to 5:95.

14. Copolymers of conjugated perfluorovinylcyclobutene and vinylidene fluoride, in which the weight ratio of perfluorovinylcyclobutene to the other monomer is in the range of from about 95:5 to 5:95.

15. Copolymers of conjugated perfluorovinylcyclobutene and tetrafluoroethylene, in which the weight ratio of perfluorovinylcyclobutene to the other monomer is in the range of from about 95:5 to 5:95.

16. Copolymers of conjugated perfluorovinylcyclobutene and chlorotrifluoroethylene, in which the weight ratio of perfluorovinylcyclobutene to the other monomer is in the range of from about 95:5 to 5:95.

17. Copolymers of conjugated perfluorovinylcyclobutene and 2,2,2-trifluoroethyl vinyl ether, in which the weight ratio of perfluorovinylcyclobutene to the other monomer is in the range of from about 95:5 to 5:95.

References Cited in the file of this patent

UNITED STATES PATENTS 2,462,347    Barrick _____ Feb. 22, 1949

OTHER REFERENCES

Iserson et al.: "Preparation of Polymers From Halogen-Containing Olefins and Diene Monomers," pages 6, 7, 11, 55 and 56, ASTIA Document No. AD 142116, Office of Technical Services, U.S. Department of Commerce, Washington 25, D.C., November 1957.